United States Patent [19]

Takano

[11] Patent Number: 5,010,142

[45] Date of Patent: Apr. 23, 1991

[54] RUBBER COMPOSITIONS FOR TIRE INNER LINERS

[75] Inventor: Haruhiro Takano, Odawara, Japan

[73] Assignee: The Yokohama Rubber Co., Ltd., Tokyo, Japan

[21] Appl. No.: 418,734

[22] Filed: Oct. 3, 1989

Related U.S. Application Data

[63] Continuation of Ser. No. 152,823, Feb. 5, 1988, abandoned.

[30] Foreign Application Priority Data

Feb. 10, 1987 [JP] Japan .................................. 62-27141

[51] Int. Cl.⁵ .............................................. C08C 19/20
[52] U.S. Cl. .................................. 525/332.4; 525/349
[58] Field of Search ........................... 525/332.3, 332.8

[56] References Cited

U.S. PATENT DOCUMENTS 4,110,319  8/1978  Lawrence ........................... 525/348
4,632,963 12/1986  Gardner ............................. 525/332.3
4,714,734 12/1987  Hashimoto ........................... 524/496

FOREIGN PATENT DOCUMENTS 55-80446   6/1980  Japan .
57-49405  10/1982  Japan .
57-172945 10/1982  Japan .
57-195760 12/1982  Japan .
59-89208   5/1984  Japan .
59-120501  7/1984  Japan .

Primary Examiner—Christopher Henderson
Attorney, Agent, or Firm—Finnegan, Henderson, Farabow, Garrett & Dunner

[57] ABSTRACT

Rubber compositions are disclosed for use as inner liners in automobile tires. Sulfur-vulcanizable, halogenated butyl rubbers are combined with 2-(4'-morpholinodithio)benzothiazole, whereby the resulting composition is rendered highly tacky and satisfactorily processable.

2 Claims, No Drawings

RUBBER COMPOSITIONS FOR TIRE INNER LINERS

This application is a continuation of application Ser. No. 07/152,823 filed Feb. 5, 1988 now abandoned.

BACKGROUND OF THE INVENTION

1. Field of the Invention

This invention relates to rubber compositions suitable for use particularly as inner linings in automobile tires.

2. Description of the Prior Art

Halogenated butyl rubbers are known in common use as inner liners for automotive tires. These rubbers are acceleratively sulfur-vulcanizable with use of certain accelerating agents. Dibenzothiazyl disulfide (DM) has been proposed to this end as disclosed for instance in Japanese Patent Laid-Open Publication Nos. 57-172945, 57-195760 and 59-89208. Japanese Patent Laid-Open Publication No. 59-120501 is directed to incorporating tetramethylthiuram disulfide (TT). A still another accelerated system of sulfur vulcanization is that two different accelerators are combined as taught in Japanese Patent Publication No. 57-49405 which involves the use of TT/DM or alkylphenol disulfide (APDS)/DM. Japanese Patent Laid-Open Publication No. 55-80446 discloses that halogenated butyl rubbers may be used to improve durability of tire sidewalls.

DM would often make the resulting rubber composition readily susceptible to blooming and hence less tacky in an unvulcanized state, and therefore, hardly processable. Blooming is the more frequent the higher the processing temperature. TT would be ineffective for improving tack strength, whereas APDS would be less resistant to scorch usually taken to mean premature vulcanization. Moreover, TT and APDS would lead to excessive crosslinking, resulting in a vulcanizate of inadequate elongation.

SUMMARY OF THE INVENTION

It is the primary object of the present invention to provide an improved rubber composition for use in the inner lining of an automobile tire which excels in tackiness prior to vulcanization without involving objectionable blooming, thus contributing to the provision of tires of enhanced physical characteristics.

The rubber composition contemplated under the invention is applicable, where desired, to tire sidewalls so as to attain improved durability.

More specifically, such rubber composition comprises a starting rubber vulcanizable with sulfur, the starting rubber comprising a halogenated butyl rubber, and as a vulcanization accelerator 2-(4'-morpholinodithio)-benzothiazole.

DETAILED DESCRIPTION OF THE INVENTION

Starting rubbers eligible for the purpose of the present invention are sulfur-vulcanizable, halogenated butyl rubbers, examples of which include chlorinated butyl rubber, brominated butyl rubber and the like. The starting rubber may be blended with a diene rubber such for example as ethylene/butadiene copolymer rubber, totalling at 100 parts by weight.

According to an important aspect of the invention, 2-(4'-morpholinodithio)benzothiazole (MDB) should be used as a vulcanization accelerator. When it is desirable to further improve vulcanizate quality, co-accelerators may be added which include tetramethylthiuram disulfide and alkylphenol disulfide for their freedom from blooming. No particular restriction is imposed upon the amount of MDB to be used which however may be feasibly in the range of 0.2 to 2.0 parts by weight based on 100 parts by weight of the starting rubber.

In Table 1 there is shown a typical recipe for the rubber composition according to the invention.

TABLE 1

| Component | Weight Part |
|---|---|
| halogenated rubber | 30–100 |
| diene rubber | 70–0 |
| sulfur | 0.2–2.0 |
| MDB | 0.2–2.0 |

Various other additives may be employed which include reinforcing agents, fillers, tackifiers, softeners, vulcanizing activators and the like.

The following examples are provided for a better understanding of the present invention. All formulations are in part by weight in these examples.

EXAMPLES 1 TO 6 AND COMPARATIVE EXAMPLES 1 TO 10

Different rubber compositions were prepared as shown in Table 2. All these compositions were examined for their physical properties with the results tabulated.

Tackiness and blooming were determined under the following conditions.

Tackiness

A vulcanized test composition was rolled at from 105° to 100° C. into a rubber sheet which was thereafter exposed to accelerated blooming on a stitcher. Tack strength was measured at an interval of 4, 24 and 72 hours and at a peel speed of 125 cm/minute with the sheet contact-bonded at 500 g for 3 seconds with use of a tester tradenamed Picma-Tack Tester II, Toyo Seiki Seisakusho, Ltd.

Blooming

Analysis was made of the infrared spectrum (ATR-IR) on a rubber sheet prepared as in the tackiness test and disposed for 72 hours. Bloomed material was inspected and identified.

As appears clear from Examples 1 to 6, the rubber compositions according to the invention are all free from blooming and satisfactory in respect of tackiness and other qualities tested.

DM has been found to invite blooming as is apparent from Comparative Examples 1, 3, 5, 7 and 9. TT when used alone or combined with DM, Comparative Examples 2 and 3, was insufficient in tackiness. APDS, either alone or in combination with DM, showed premature vulcanization as evidenced by Comparative Examples 4 and 5. The use of TT and APDS, Comparative Examples 2 to 5, was inadequate in elongation due to overcuring. Controls using only NOBS, Comparative Examples 8 and 10, failed to improve scorch resistance.

Having thus described the invention, it will be apparent to those skilled in the art that various changes and modifications may be made without departing from the scope of the appended claims.

TABLE 2

| Formulation | Comparative Example 1 | Example 1 | Comparative Example 2 | 3 | 4 | 5 | 6 |
|---|---|---|---|---|---|---|---|
| Br-IIR | 100 | 100 | 80 | 80 | 80 | 80 | 80 |
| SMR-20 | | | 20 | 20 | 20 | 20 | 20 |
| GPF carbon | 65 | 65 | 65 | 65 | 65 | 65 | 65 |
| stearic acid | 1 | 1 | 1 | 1 | 1 | 1 | 1 |
| tackifier | 4 | 4 | 4 | 4 | 4 | 4 | 4 |
| FR-120[1] | 10 | 10 | 10 | 10 | 10 | 10 | 10 |
| paraffinic oil | 6 | 6 | 6 | 6 | 6 | 6 | 6 |
| zinc oxide | 5 | 5 | 5 | 5 | 5 | 5 | 5 |
| TT | | | 1 | 1 | | | |
| APDS | | | | | 1 | 1 | |
| DM | 1 | | | 1 | | 1 | 1 |
| NOBS[2] | | | | | | | |
| MDB | | 1 | | | | | |
| sulfur | 0.5 | 0.5 | 0.5 | 0.5 | 0.5 | 0.5 | 0.5 |
| scorch time @ 125° C., $t_5$ (min) | 26.2 | 28.3 | 10.3 | 12.2 | 5.8 | 6.8 | 9.7 |
| tack strength (g) | | | | | | | |
| after 4 hr | 1080 | 1100 | 780 | 750 | 800 | 720 | 750 |
| after 24 hr | 960 | 1140 | 680 | 510 | 720 | 640 | 600 |
| after 72 hr | 910 | 1170 | 580 | 420 | 740 | 570 | 550 |
| blooming after 72 hr | positive (DM) | negative | negative | positive (DM) | negative | positive (DM) | positive (DM) |
| tensile quality 160° C. × 15' curing | | | | | | | |
| 300% stress (kg/cm) | 44 | 50 | 65 | 60 | 69 | 66 | 48 |
| strength (kg/cm) | 86 | 98 | 108 | 96 | 104 | 104 | 100 |
| elongation | 790 | 750 | 590 | 620 | 510 | 570 | 690 |
| hardness 160° C. × 15' curing | 54 | 53 | 55 | 57 | 55 | 57 | 51 |

| Formulation | Examples 2 | 3 | 4 | Comparative Examples 7 | 8 | Example 5 | Comparative Examples 9 | 10 | Example 6 |
|---|---|---|---|---|---|---|---|---|---|
| Br-IIR | 80 | 80 | 80 | 60 | 60 | 60 | 40 | 40 | 40 |
| SMR-20 | 20 | 20 | 20 | 40 | 40 | 40 | 60 | 60 | 60 |
| GPF carbon | 65 | 65 | 65 | 65 | 65 | 65 | 65 | 65 | 65 |
| stearic acid | 1 | 1 | 1 | 1 | 1 | 1 | 1 | 1 | 1 |
| tackifier | 4 | 4 | 4 | 4 | 4 | 4 | 4 | 4 | 4 |
| FR-120[1] | 10 | 10 | 10 | 10 | 10 | 10 | 10 | 10 | 10 |
| paraffinic oil | 6 | 6 | 6 | 6 | 6 | 6 | 6 | 6 | 6 |
| zinc oxide | 5 | 5 | 5 | 5 | 5 | 5 | 5 | 5 | 5 |
| TT | | 1 | | | | | | | |
| APDS | | | 1 | | | | | | |
| DM | | | | 1 | | | 1 | | |
| NOBS[2] | | | | | 1 | | | 1 | |
| MDB | 1 | 1 | 1 | | | 1 | | | 1 |
| sulfur | 0.5 | 0.5 | 0.5 | 1 | 1 | 1 | 1.5 | 1.5 | 1.5 |
| scorch time @ 125° C., $t_5$ (min) | 11.6 | 10.9 | 6.1 | 7.8 | 6.4 | 9.0 | 8.0 | 5.4 | 9.8 |
| tack strength (g) | | | | | | | | | |
| after 4 hr | 750 | 750 | 810 | 830 | 1430 | 1270 | 420 | 920 | 890 |
| after 24 hr | 720 | 720 | 800 | 780 | 1210 | 1130 | 270 | 910 | 880 |
| after 72 hr | 740 | 660 | 730 | 610 | 1080 | 1060 | 250 | 870 | 850 |
| blooming after 72 hr | negative | negative | negative | positive (DM) | negative | negative | positive (DM) | negative | negative |
| tensile quality 160° C. × 15' curing | | | | | | | | | |
| 300% stress (kg/cm) | 54 | 65 | 67 | 65 | 52 | 64 | 74 | 80 | 78 |
| strength (kg/cm) | 105 | 103 | 102 | 119 | 98 | 115 | 132 | 130 | 137 |
| elongation | 620 | 590 | 550 | 580 | 570 | 570 | 550 | 510 | 540 |
| hardness 160° C. × 15' curing | 52 | 57 | 56 | 52 | 50 | 52 | 54 | 57 | 55 |

[1] oxidized petroleum pitch, Fuji Kosan Co., Ltd.
[2] N-oxydiethylene-2-benzothiazyl sulfenamide

What is claimed is:

1. A rubber composition for use as an inner lining in automotive tires which comprises a sulfur vulcanizable starting rubber consisting essentially of a halogenated butyl rubber and not including a silicone rubber, and from 0.2 to 2.0 parts by weight per 100 parts of the starting rubber of an accelerator comprising 2-(4'morpholinodithio)benzothiazole.

2. The rubber composition of claim 1, wherein said halogentated butyl rubber is selected from the group consisting of chlorinated or brominated butyl rubber.